(12) United States Patent
Canto et al.

(10) Patent No.: US 9,021,068 B2
(45) Date of Patent: Apr. 28, 2015

(54) MANAGING A NETWORKED STORAGE CONFIGURATION

(75) Inventors: Christopher Canto, Hampshire (GB); Bernard John Grainger, Hampshire (GB); Nicholas Michael O'Rourke, Hants (GB); Sivan Tal, Yokneam Illit (IL)

(73) Assignee: International Business Machines Corporation, Armonk, OH (US)

( * ) Notice: Subject to any disclaimer, the term of this patent is extended or adjusted under 35 U.S.C. 154(b) by 1216 days.

(21) Appl. No.: 12/368,939

(22) Filed: Feb. 10, 2009

(65) Prior Publication Data

US 2009/0204708 A1 Aug. 13, 2009

(30) Foreign Application Priority Data

Feb. 13, 2008 (EP) .................................... 08151349

(51) Int. Cl.
*G06F 15/177* (2006.01)
*G06F 15/173* (2006.01)
*H04L 12/24* (2006.01)
*G06F 3/06* (2006.01)
*H04L 29/08* (2006.01)

(52) U.S. Cl.
CPC .......... *H04L 41/082* (2013.01); *H04L 41/0866* (2013.01); *H04L 41/0813* (2013.01); *G06F 3/0604* (2013.01); *G06F 3/0617* (2013.01); *G06F 3/067* (2013.01); *H04L 67/1097* (2013.01)

(58) Field of Classification Search
CPC .............. H04L 67/1097; H04L 41/08; H04L 41/0813–41/082; H04L 41/0866–41/0873; G06F 3/067–3/0689; G06F 3/0604–3/0607; G06F 3/0617; G06F 3/0614

USPC ................................................... 709/220–226
See application file for complete search history.

(56) References Cited

U.S. PATENT DOCUMENTS

| | | | |
|---|---|---|---|
| 5,517,316 A * | 5/1996 | Hube ........................... 358/296 |
| 6,816,917 B2 * | 11/2004 | Dicorpo et al. .................. 710/5 |
| 7,269,722 B1 * | 9/2007 | Neary ............................... 713/1 |
| 7,478,404 B1 * | 1/2009 | Campbell ..................... 719/318 |
| 8,019,799 B1 * | 9/2011 | Batterywala .................. 707/822 |
| 2003/0023620 A1 * | 1/2003 | Trotta .......................... 707/203 |
| 2003/0033370 A1 * | 2/2003 | Trotta .......................... 709/204 |
| 2006/0112112 A1 * | 5/2006 | Margolus et al. ............. 707/100 |
| 2006/0116990 A1 * | 6/2006 | Margolus et al. ................ 707/3 |
| 2007/0130077 A1 * | 6/2007 | Jagadeesan et al. ............ 705/59 |
| 2007/0208849 A1 * | 9/2007 | Ely et al. ....................... 709/224 |
| 2008/0065702 A1 * | 3/2008 | Dickerson et al. ............ 707/202 |
| 2008/0242247 A1 * | 10/2008 | Shaffer et al. .............. 455/187.1 |
| 2011/0252269 A1 * | 10/2011 | Fabbrocino ...................... 714/2 |

\* cited by examiner

*Primary Examiner* — Patrice Winder
*Assistant Examiner* — Julian Chang
(74) *Attorney, Agent, or Firm* — William K. Konrad; Konrad, Raynes, Davda and Victor LLP

(57) ABSTRACT

Managing a networked storage system having a host operable to connect through a network fabric to storage apparatus comprises: a configuration component for inputting a configuration change into the networked storage system responsive to change instructions; a monitoring component operable in communication with the host and the network fabric to monitor I/O activity associated with elements of the networked storage system; an activity data storage component responsive to the monitoring component for storing a record of a monitored I/O activity; an analysis component, responsive to the configuration component for inputting configuration changes, for analysing the record of a monitored I/O activity for a recent activity; and an alert component, responsive to the analysis component detecting a recent activity, for alerting the configuration component.

20 Claims, 3 Drawing Sheets

MANAGING A NETWORKED STORAGE CONFIGURATION

CROSS-REFERENCE TO RELATED FOREIGN APPLICATION

This application is a non-provisional application that claims priority benefits under Title 35, Unites States Code, Section 119(a)-(d) from European Patent Application serial No. 08151349.1, filed Feb. 13, 2008, and assigned to the assignee of the present application, and incorporated by reference in its entirety.

FIELD OF THE INVENTION

The present invention relates to a technology for managing a networked storage configuration, and more particularly, for managing a networked storage configuration in such a way as to alleviate problems caused by configuration change errors in such systems.

BACKGROUND OF THE INVENTION

When multiple storage systems are connected together, typically by means of a Storage Area Network (SAN), it is typical that logical relationships are created between devices. These relationships are sometimes known as mappings. These mappings provide the detailed information about a group of systems and which logical parts of the target system (typically a storage controller) can be accessed by the initiator system, typically a host or another storage system (perhaps a storage virtualization system). These relationships are typically described in terms of the specific World Wide Port Name (WWPN), or group of WWPNs of the Initiator, the WWPN, or group of ports, or all ports of the Target. The Initiator-Target relationship may be described in terms of a group of Logical Units, and for each Logical Unit, a Logical Unit Number, or LUN.

Taking a simple example, as illustrated in FIG. 1:
  a. A Storage controller (102) has ports AA (108) and BB (110);
  b. A Host system (100) has ports XX (112) and YY (114); and
  c. The storage controller (102) has logical Units 01 (104) and 02 (106).

A set of port relationships to allow the Host system (100) to access a group of logical units in this exemplary system might be:
  a. AA to XX;
  b. AA to YY;
  c. BB to XX; and
  d. BB to YY.

For this host-storage group the logical unit number (LUN) assignments might be:
  a. Logical Unit (LU) 01 accessed at Logical Unit Number 00
  b. Logical Unit (LU) 02 accessed at logical Unit Number 01.

Thus, in FIG. 1 there is shown in schematic form an apparatus or arrangement according to the prior art, in which host 100 is aware of host LUs 116, 118. Host 100 has ports AA and BB (respectively 108, 110), which are connected to storage controller 102 through storage controller ports YY and XX (respectively 114, 112). Storage controller 102 controls and is in communication with logical units 01 and 02 (respectively 104, 106).

Most storage systems have a similar access model, as this is largely driven by the common interfaces defined by SCSI and Fibre Channel standards.

A common problem with storage systems, particularly as they grow larger and more complex, is the increasing chance of an administrator making an incorrect change to the configuration by accident. For the example given above, it is easy to see how an administrator could confuse the logical unit ID in the storage controller with the logical unit number seen by the host system, leading to a loss of access and/or data if they then reconfigured the wrong underlying LU. Most conventional systems will provide generalized warnings that changes may cause loss of data and some provide a general warning that making a change may cause loss of access. However, these warnings are generalized and occur so commonly that they may be ignored by users for lack of specificity.

It would thus be desirable to have an improved technology for alleviating confusion and thus preventing at least some errors during the process of changing the configuration of a storage network.

SUMMARY OF THE INVENTION

The present invention accordingly provides, in a first aspect, an apparatus for managing a networked storage system having a host operable to connect through a network fabric to storage apparatus, and comprising: a configuration component for inputting a configuration change into said networked storage system responsive to change instructions; a monitoring component operable in communication with said host and said network fabric to monitor I/O activity associated with elements of said networked storage system; an activity data storage component responsive to said monitoring component for storing a record of a monitored I/O activity; an analysis component, responsive to said configuration component for inputting configuration changes, for analysing said record of a monitored I/O activity for a recent activity; and an alert component, responsive to said analysis component detecting a recent activity, for alerting said configuration component.

Preferably, said configuration change comprises one of: a change to an LU number of an LU, a removal of a port from an access group, a removal of a port from a zone, a deletion of an LU, a format of an LU, or a start of a point-in-time copy relationship.

Preferably, said monitored I/O activity comprises one of: an I/O activity at a port, an I/O activity at an LU; or an I/O activity across said network fabric.

Preferably, said record of a monitored I/O activity is stored in a rolling log storage.

Preferably, said analysis component detects a recent activity by comparing an activity time with a recency threshold.

In a second aspect, there is provided a method for managing a networked storage system having a host operable to connect through a network fabric to storage apparatus, comprising the steps of: inputting, by a configuration component, a configuration change into said networked storage system responsive to change instructions; monitoring, by a monitoring component operable in communication with said host and said network fabric, I/O activity associated with elements of said networked storage system; storing, by an activity data storage component responsive to said monitoring component, a record of a monitored I/O activity; analysing, by an analysis component responsive to said configuration component for inputting configuration changes, said record of a monitored I/O activity for a recent activity; and alerting, by an alert component responsive to said analysis component detecting a recent activity, said configuration component.

Preferably, said configuration change comprises one of: a change to an LU number of an LU, a removal of a port from an access group, a removal of a port from a zone, a deletion of an LU, a format of an LU, or a start of a point-in-time copy relationship.

Preferably, said monitored I/O activity comprises one of: an I/O activity at a port, an I/O activity at an LU; or an I/O activity across said network fabric.

Preferably, said step of storing a record comprises storing said record in a rolling log storage.

Preferably, said detecting a recent activity comprises comparing an activity time with a recency threshold.

In a third aspect, there is provided a data carrier having functional data thereon, the functional data comprising functional computer data structures to, when loaded into a computer system and operated upon thereby, enable the computer system to perform all the steps of a method according to the second aspect.

In a fourth aspect, there is provided a computer program comprising computer program code to, when loaded into a computer system and executed thereon, cause the computer system to perform all the steps of a method according to the second aspect.

Embodiments of the present invention, in its broadest aspect, provide apparatus and methods for managing a networked storage configuration by recording a history of the last significant activity on each Logical Unit at a per-relationship level, thus allowing the storage system to give a more accurate warning to the user that the change requested will likely cause a loss of access, as there has been I/O (probably Reads and Writes) to the Logical Unit in recent history.

BRIEF DESCRIPTION OF THE DRAWINGS

A preferred embodiment of the present invention will now be described, by way of example only, with reference to the accompanying drawing figures, in which.

DETAILED DESCRIPTION OF THE PREFERRED EMBODIMENTS

Broadly, the present invention, in its preferred embodiments, provides a means for logging recent activity performed against a logical unit or fabric port and storing a rolling "most-recent" activity trail for a specified period in order to provide a warning or an automated preventative mechanism to forestall configuration changes that could cause problems because the logical unit or fabric port is likely to be in continued use. The activity trail is most preferably stored in a rolling or circular log format, such that newer entries overwrite older entries after a time period, as the older entries cease to be relevant to recent activity.

Figure 1:
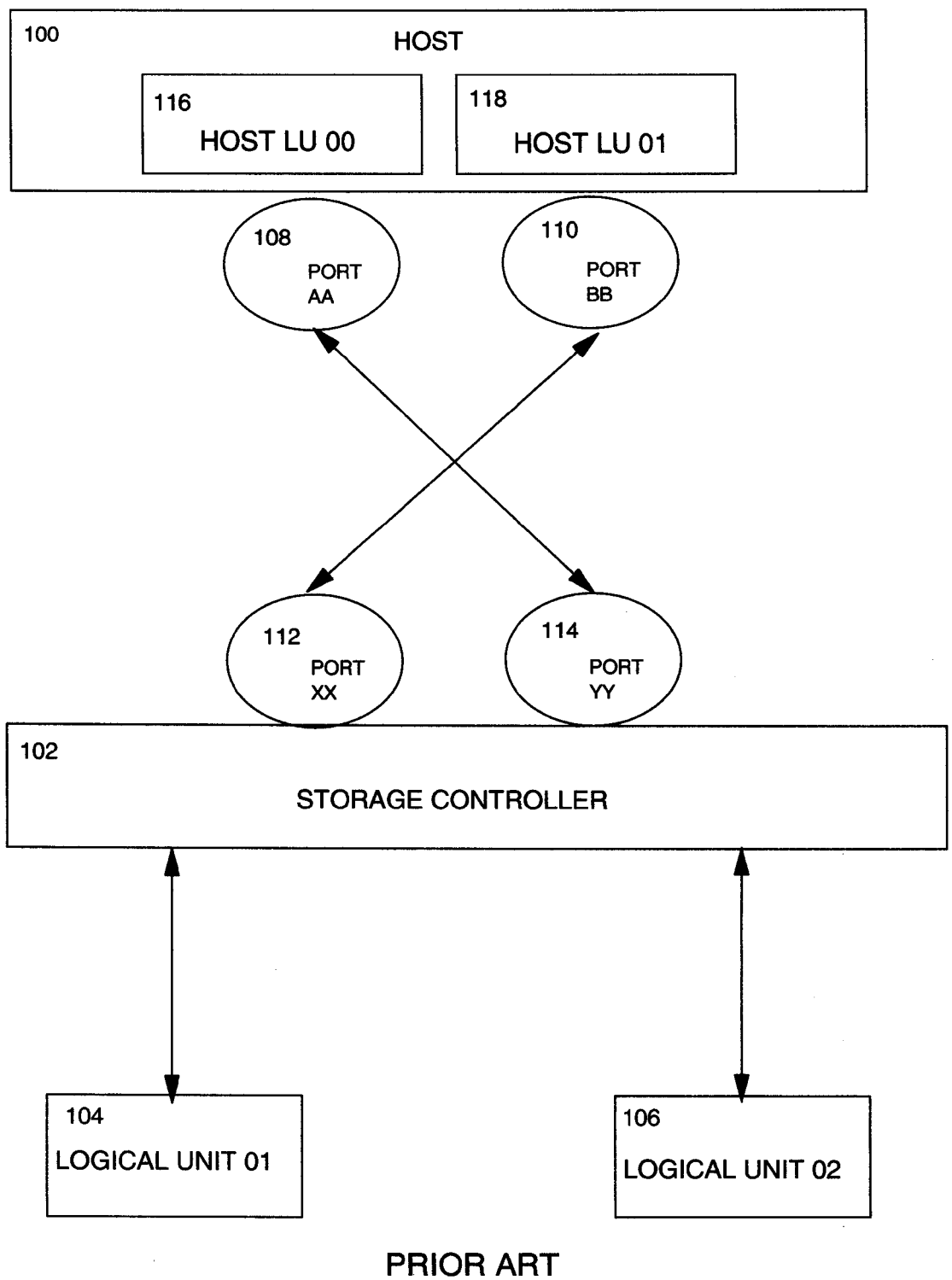
FIG. 1 shows in schematic form an apparatus or arrangement according to the prior art.

In FIG. 1, as previously described, there is shown in schematic form an apparatus or arrangement according to the prior art, in which host 100 is aware of host LUs 116, 118. Host 100 has ports AA and BB (respectively 108, 110), which are connected to storage controller 102 through storage controller ports YY and XX (respectively 114, 112). Storage controller 102 controls and is in communication with logical units 01 and 02 (respectively 104, 106).

In the arrangement of FIG. 1, the disadvantages already described in the section entitled "Background of the Invention" above are evidenced. In particular, although the example shown is much simplified, it will be clear to one of ordinary skill in the art that the additional complexity of real world systems can only exacerbate the potential for errors leading to serious consequences, such as data loss.

Figure 2:
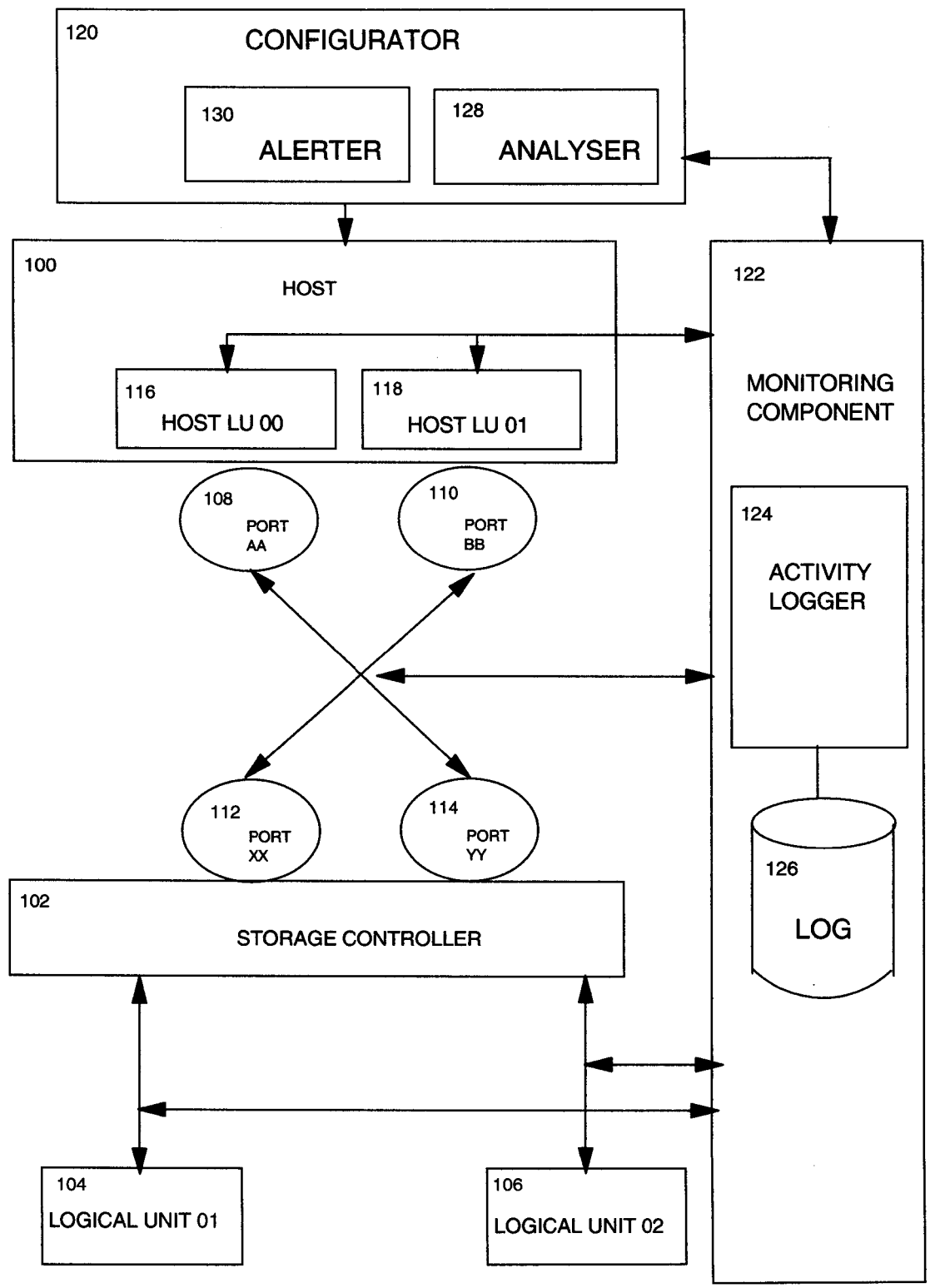
FIG. 2 shows in simplified schematic form an apparatus or arrangement according to a preferred embodiment of the present invention; and c.

Turning now to FIG. 2, there is shown an apparatus or arrangement of apparatus according to a preferred embodiment of the present invention, an apparatus for managing a networked storage system having a host operable to connect through a network fabric to storage apparatus.

In FIG. 2, host 100 is aware of host LUs 116, 118. Host 100 has ports AA and BB (respectively 108, 110), which are connected to storage controller 102 through storage controller ports YY and XX (respectively 114, 112). Storage controller 102 controls and is in communication with logical units 01 and 02 (respectively 104, 106).

The apparatus of FIG. 2 further comprises a configuration component 120 for inputting configuration changes into the networked storage system responsive to change instructions, and a monitoring component 122 operable in communication with the host and the network fabric to monitor I/O activity associated with physical and logical elements of the networked storage system.

Monitoring component 122 is in communication with, or may include, an activity data storage component, such as activity logger 124 responsive to the monitoring component for storing records of monitored I/O activity in log 126.

Configuration component 120 is in communication with, or may include, an analysis component 128 responsive to the inputting of configuration changes, for analysing the records of monitored I/O activity for recent activity.

Configuration component 120 is in communication with, or may include, an alert component 130, responsive to the analysis component 128 detecting recent activity, for alerting the configuration component.

For each logical relationship, a time is recorded for the most recent operation; this is then examined each time a configuration change is submitted to determine if the operation should be prevented and/or an appropriate warning provided to the user.

Using the much simplified example already given in the section entitled "Background of the Invention" above:

Logical unit 01 has relationships as follows, with last access data added:

AA accessing via XX at logical Unit number 00: last access was a Read 8 seconds ago AA accessing via YY at logical Unit number 00: last access was a Write 120 seconds ago BB accessing via XX at logical Unit number 00: last access was a Read 10000 seconds ago BB accessing via YY at logical Unit number 00: last access was a Write 10000 seconds ago Based on the above, it might be permissible to allow the user to delete the Host port relationship for host port BB as the most recent accesses were long enough ago for it to be probable that the configuration change is low risk. However, as accesses have occurred on the other paths a warning could be generated to suggest that the proposed configuration action might be removing redundant paths to a logical unit that is being accessed currently by host port AA.

In an alternative, the user attempting to change the Logical Unit Number from 00 to 05, could receive a strong warning that this is changing a currently active logical unit, based on the recent access history.

Given another example:

AA accessing via XX at logical Unit number 00: has never been accessed

AA accessing via YY at logical Unit number 00: last access was a Write 100000 seconds ago BB accessing via XX at logical Unit number 00: last access was a Read 10000 seconds ago BB accessing via YY at logical Unit number 00: last access was a Write 10000 second If the user was attempting a deletion of these relationships the system need not generate any access history based warnings to prevent an accidental loss of access.

The first preferred embodiment of the present invention, in its broadest aspect, thus provides a method for managing a networked storage configuration by recording a history of recent activity on each Logical Unit at a per-relationship level, thus allowing the storage system to give a more accurate warning to the user that the change requested will likely cause a loss of access, as there has been I/O (probably Reads and Writes) to the Logical Unit in recent history.

Figure 3:
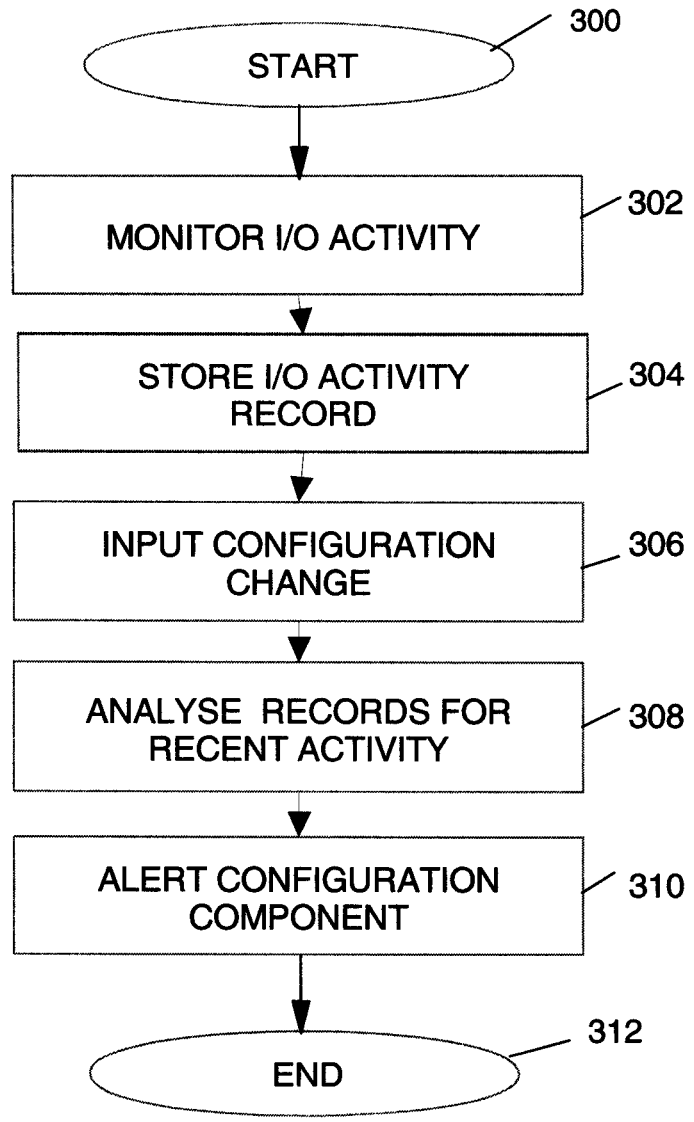
FIG. 3 shows in flowchart form the steps of a method according to a preferred embodiment of the present invention.

Turning now to FIG. 3, there are shown in flowchart form the steps of a method according to a preferred embodiment of the present invention.

FIG. 3 shows, following START step 300, the step of monitoring 302, by a component operable in communication with the host and the network fabric, I/O activity associated with physical and logical elements of the networked storage system. At step 304, an activity data storage component responsive to the monitoring component stores a record of a monitored I/O activity. At step 306, a configuration component inputs configuration changes into the networked storage system responsive to change instructions.

At step 308, an analysis component responsive to the configuration component for inputting configuration changes analyses the record of a monitored I/O activity for a recent activity, and at step 310, an alert component responsive to the analysis component detecting a recent activity, alerts the configuration component. The steps of the method complete at END step 312.

A second preferred embodiment of the present invention, in its broadest aspect, thus provides an apparatus for managing a networked storage configuration by recording a history of the last significant activity on each Logical Unit at a per-relationship level, thus allowing the storage system to give a more accurate warning to the user that the change requested will likely cause a loss of access, as there has been I/O (probably Reads and Writes) to the Logical Unit in recent history.

The warning logic of the preferred embodiments may advantageously be applied to any type of configuration change that might impact the access to storage by a host; for example: changes to the Logical Unit Number of a Logical Unit, removal of a host port from the access group, deletion of the Logical Unit itself, and the like. Such warning logic may also be extended to cover other actions, like Logical Unit format or the initiation of copy services like Flash Copy that might overwrite the logical unit contents.

The preferred embodiments of the present invention may also be extended to provide monitoring of recent activity in the network fabric itself and issuing a warning to a user attempting to remove ports from a zone as appropriate. The fabric switches may thus monitor each frame and check source and target port of the frame (for routing and for zoning enforcement purposes). In this way the switch can trace the latest frame exchanged between each pair of N_Ports (i.e. host and storage controller ports) and issue a warning if the user attempts to remove a port from a zone and the port had recently exchanged frames with another port in the zone. The switch may also use the current open port logins information to decide on issuing a warning. With this expansion, the preferred embodiments of the present invention may thus also provide accurate and targeted warnings about potential errors in zoning configuration changes.

The preferred embodiments of the present invention are advantageously workable without changes to existing architectures (e.g. SCSI architecture). However, if changes can be made to the architecture then a further extension advantageously improves the reliability of the warning mechanism of the preferred embodiments. The further extension comprises adding two new SCSI commands (or subcommands): "Open" and "Close", which would simply set/clear an "in-use" bit saying this LUN is being used for I/O, which would be tested by the configuration utility to see if it is safe to delete or change mappings. Advantageously, normal I/O would be unaffected by the state of the "in-use" bit.

A further advantage of this refinement is that it could be used throughout the architecture, so the open would cascade from the host, down through any controllers, and to all affected logical units, and even down to the physical disks. It would also work for multiple hosts—the "in-use" bit would remain set until all hosts that had sent opens had sent closes. This would ensure that for a LUN shared by multiple hosts, configuration warnings would be generated if any host still has access.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In one alternative, the preferred embodiment of the present invention may be realized in the form of a computer implemented method of deploying a service comprising steps of deploying computer program code operable to, when deployed into a computer infrastructure and executed thereon, cause said computer system to perform all the steps of the method.

In a further alternative, the preferred embodiment of the present invention may be realized in the form of data carrier having functional data thereon, said functional data comprising functional computer data structures to, when loaded into a computer system and operated upon thereby, enable said computer system to perform all the steps of the method.

It will be clear to one skilled in the art that many improvements and modifications can be made to the foregoing exemplary embodiment without departing from the scope of the present invention.

What is claimed is:

1. An apparatus for managing a networked storage system having a host adapted to connect through a network fabric to storage apparatus, and comprising:
    a configuration component inputting a configuration change request into said networked storage system in response to change instructions;
    a monitoring component communicating with said host and said network fabric and adapted to monitor input/output (I/O) data transfers associated with elements of said networked storage system;
    an activity data storage component responsive to said monitoring component and storing a record of a monitored I/O data transfer;
    an analysis component, responsive to said configuration component and inputting configuration change requests, to analyse said record of a monitored I/O data transfer and to detect a recent data transfer; and
    an alert component, responsive to said analysis component and alerting said configuration component in response to said analysis component detecting a recent data transfer, to provide a warning that a configuration change in response to said configuration request may cause loss of access to an element of said networked storage system associated with said recent data transfer.

2. The apparatus according to claim 1, wherein said network storage system elements includes a plurality of logical units (LUs), ports, access groups and zones, and said configuration change comprises one of: a change to an LU number of an LU of said plurality of LUs, a removal of a port of said plurality of ports from an access group of said plurality of access groups, a removal of a port of said plurality of ports from a zone of said plurality of zones, a deletion of an LU of said plurality of LUs, a format of an LU of said plurality of LUs, or a start of a point-in-time copy relationship.

3. The apparatus according to claim 1, wherein said network storage system elements includes a plurality of logical units (LUs) and ports, and said monitored I/O data transfer comprises one of: an I/O data transfer at a port of said plurality of ports, an I/O data transfer at an LU of said plurality of LUs; and an I/O data transfer across said network fabric.

4. The apparatus according to claim 1, wherein said activity data storage component includes a rolling log storage and said record of a monitored I/O data transfer is stored in said rolling log storage.

5. The apparatus according to claim 1, wherein said analysis component detects a recent data transfer by comparing a data transfer time with a recency threshold.

6. A method for managing a networked storage system having a host coupled through a network fabric to storage apparatus, comprising:
    inputting, by a configuration component, a configuration change request into said networked storage system in response to change instructions;
    monitoring, by a monitoring component in communication with said host and said network fabric, input/output (I/O) data transfers associated with elements of said networked storage system;
    storing, by an activity data storage component responsive to said monitoring component, a record of a monitored I/O data transfer;
    analysing, by an analysis component responsive to said configuration component for inputting configuration requests, said record of a monitored I/O data transfer for a recent data transfer; and
    alerting, by an alert component responsive to said analysis component detecting a recent data transfer, said configuration component to provide a warning that a configuration change in response to said configuration request may cause loss of access to an element of said networked storage system associated with said recent data transfer.

7. The method according to claim 6, wherein said configuration change comprises one of: a change to a logical unit (LU), number of an LU, a removal of a port from an access group, a removal of a port from a zone, a deletion of an LU, a format of an LU, and a start of a point-in-time copy relationship.

8. The method according to claim 6, wherein said monitored I/O data transfer comprises one of: an I/O data transfer at a port, an I/O data transfer at a logical unit (LU), and an I/O data transfer across said network fabric.

9. The method according to claim 6, wherein said storing a record comprises storing said record in a rolling log storage.

10. The method according to claim 6, wherein said detecting a recent data transfer comprises comparing a data transfer time with a recency threshold.

11. An article of manufacture comprising a tangible computer readable medium having instructions stored thereon which are capable of being executed by a computer to perform operations for managing a networked storage system having a host coupled through a network fabric to storage apparatus, the operations comprising:

inputting, by a configuration component, a configuration change request into said networked storage system in response to change instructions;

monitoring, by a monitoring component in communication with said host and said network fabric, input/output (I/O) data transfers associated with elements of said networked storage system;

storing, by an activity data storage component responsive to said monitoring component, a record of a monitored I/O data transfer;

analysing, by an analysis component responsive to said configuration component for inputting configuration requests, said record of a monitored I/O data transfer for a recent data transfer; and alerting, by an alert component responsive to said analysis component detecting a recent data transfer, said configuration component to provide a warning that a configuration change in response to said configuration request may cause loss of access to an element of said networked storage system associated with said recent data transfer.

12. The article according to claim 11, wherein said configuration change comprises one of: a change to a logical unit (LU) number of an LU, a removal of a port from an access group, a removal of a port from a zone, a deletion of an LU, a format of an LU, or a start of a point-in-time copy relationship.

13. The article according to claim 11, wherein said monitored I/O data transfer comprises one of: an I/O data transfer at a port, an I/O data transfer at a logical unit (LU); and an I/O data transfer across said network fabric.

14. The article according to claim 11, wherein storing a record comprises storing said record in a rolling log storage.

15. The article according to claim 11, wherein said detecting a recent data transfer comprises comparing a data transfer time with a recency threshold.

16. A networked storage system for use with a network fabric, comprising:

storage apparatus;

a host coupled through the network fabric to the storage apparatus;

a configuration component inputting a configuration change request into said networked storage system in response to change instructions;

a monitoring component in communication with said host and said network fabric and adapted to monitor input/output (I/O) data transfer associated with elements of said networked storage system;

an activity data storage component responsive to said monitoring component and storing a record of a monitored I/O data transfer;

an analysis component, responsive to said configuration component and inputting configuration change requests, to analyse said record of a monitored I/O data transfer and to detect a recent data transfer; and an alert component, responsive to said analysis component and alerting said configuration component in response to said analysis component detecting a recent data transfer to provide a warning that a configuration change in response to said configuration request may cause loss of access to an element of said networked storage system associated with said recent data transfer.

17. The networked storage system according to claim 16, wherein said network storage system elements includes a plurality of logical units (LUs), ports, access groups and zones, and said configuration change comprises one of: a change to an LU number of an LU of said plurality of LUs, a removal of a port of said plurality of ports from an access group of said plurality of access groups, a removal of a port of said plurality of ports from a zone of said plurality of zones, a deletion of an LU of said plurality of LUs, a format of an LU of said plurality of LUs, and a start of a point-in-time copy relationship.

18. The networked storage system according to claim 16, wherein said network storage system elements includes a plurality of logical units (LUs) and ports, and said monitored I/O data transfer comprises one of: an I/O data transfer at a port of said plurality of ports, an I/O data transfer at an LU of said plurality of LUs; and an I/O data transfer across said network fabric.

19. The networked storage system according to claim 16, wherein said data transfer data storage component includes a rolling log storage and said record of a monitored I/O data transfer is stored in said rolling log storage.

20. The networked storage system according to claim 16, wherein said analysis component detects a recent data transfer by comparing a data transfer time with a recency threshold.

* * * * *